(12) United States Patent
Baydoun et al.

(10) Patent No.: US 12,157,424 B2
(45) Date of Patent: Dec. 3, 2024

(54) ELECTRIFIED VEHICLE TRACTION POWERTRAIN MODULE HAVING EXTERNALLY INTEGRATED FUSE BOX

(71) Applicant: Ford Global Technologies, LLC, Dearborn, MI (US)

(72) Inventors: Mohammed Michael Baydoun, Dearborn Heights, MI (US); Senate Ghanim, Dearborn, MI (US); David A. Wilson, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 17/883,681

(22) Filed: Aug. 9, 2022

(65) Prior Publication Data

US 2024/0051479 A1 Feb. 15, 2024

(51) Int. Cl.
*B60R 16/023* (2006.01)
*H02G 3/08* (2006.01)

(52) U.S. Cl.
CPC ........... *B60R 16/0238* (2013.01); *H02G 3/08* (2013.01)

(58) Field of Classification Search
CPC .... H02G 3/08; H01H 85/20; H01H 2085/208; B60R 16/0238
See application file for complete search history.

(56) References Cited

U.S. PATENT DOCUMENTS

| | | | |
|---|---|---|---|
| 7,919,203 B2 | 4/2011 | Shibuya et al. | |
| 2002/0017405 A1* | 2/2002 | Nada | B60L 3/0084 903/903 |
| 2012/0244398 A1 | 9/2012 | Youngs et al. | |
| 2012/0321934 A1* | 12/2012 | Hopkins | B60L 3/108 429/151 |
| 2014/0117754 A1 | 5/2014 | Kreutzer et al. | |
| 2015/0042442 A1* | 2/2015 | Garascia | H01H 85/22 337/201 |
| 2016/0304041 A1 | 10/2016 | Lennevi et al. | |
| 2018/0201153 A1 | 7/2018 | Sturza et al. | |
| 2020/0152946 A1 | 5/2020 | Burkman | |
| 2020/0231050 A1 | 7/2020 | Hirukawa et al. | |

* cited by examiner

*Primary Examiner* — Carlos Amaya
(74) *Attorney, Agent, or Firm* — David B. Kelley; Brooks Kushman P.C.

(57) ABSTRACT

A high-voltage module, such as a traction battery, a traction inverter, or a DC/DC converter of a traction powertrain of an electrified vehicle (EV), includes an enclosure, an electronics assembly for performing electrical power operations, and a fuse box for providing a power distribution and fuse protection arrangement to the electronics assembly. The enclosure includes a main enclosure portion and a secondary enclosure portion integrated together. The electronics assembly is housed within the main enclosure portion and the fuse box is housed within the secondary enclosure portion.

15 Claims, 4 Drawing Sheets

ELECTRIFIED VEHICLE TRACTION POWERTRAIN MODULE HAVING EXTERNALLY INTEGRATED FUSE BOX

TECHNICAL FIELD

The present invention relates to a traction powertrain of an electrified vehicle.

BACKGROUND

An electrified vehicle includes a traction powertrain having high-voltage (HV) modules such as a traction battery and an inverter. The HV modules may be connected to one another and other modules/devices of the traction powertrain by junction boxes.

SUMMARY

A high-voltage (HV) module is provided. The HV module includes an enclosure and a fuse box. The enclosure includes a main enclosure portion and a secondary enclosure portion integrated together. The fuse box is housed within the secondary enclosure portion and provides a power distribution and fuse protection arrangement to an electronics assembly housed within the main enclosure portion.

The main enclosure portion and the secondary enclosure portion may have a common wall in being integrated together. The common wall may include at least one port for enabling an electrical connection between the fuse box and the electronics assembly to be made. Another wall of the secondary enclosure portion may include a connector port for receiving a connector for establishing an electrical connection between the fuse box and an external device.

The fuse box may be accessed without having to access either the main enclosure portion or the electronics assembly housed within the main enclosure portion.

The fuse box may include a cartridge having at least one fuse mounted thereon. The at least one fuse being replaceable without having to access the main enclosure portion or the electronics assembly housed within the main enclosure portion. The cartridge of the fuse box may further include busbars mounted thereon. The busbars being for establishing an electrical connection between the at least one fuse and the electronics assembly.

The secondary enclosure portion forms a housing receptacle for housing the fuse box and includes a separate removable cover that covers the housing receptacle. The housing receptacle of the secondary enclosure portion is sealed off from the main enclosure portion.

The HV module may be a module of a traction powertrain of an electrified vehicle. In this case, the HV module may be a traction battery, a traction inverter, a DC/DC converter, or the like.

A HV module for an electrified vehicle is also provided. The HV module includes an enclosure, an electronics assembly, and a fuse box. The enclosure includes a main enclosure portion and a secondary enclosure portion integrated together. The electronics assembly is for performing electrical power operations involving propulsion of the electrified vehicle. The electronics assembly is housed within the main enclosure portion. The fuse box is for providing a power distribution and fuse protection arrangement to the electronics assembly. The fuse box is housed within the secondary enclosure portion.

An electrified vehicle is also provided. The electrified vehicle includes a traction powertrain having a first module such as in the form of a traction battery, an inverter, or a DC/DC converter. The first module includes an enclosure, an electronics assembly for performing electrical power operations involving propulsion of the electrified vehicle, and a fuse box for providing a power distribution and fuse protection arrangement to the electronics assembly. The enclosure has a main enclosure portion and a secondary enclosure portion integrated together. The electronics assembly is housed within the main enclosure portion. The fuse box is housed within the secondary enclosure portion.

The electronics assembly of the first module is electrically connectable to a second module of the traction powertrain of the EV via the fuse box of the first module.

The second module may include a second enclosure, a second electronics assembly for performing electrical power operations, and a second fuse box for providing a power distribution and fuse protection arrangement to the second electronics assembly. The enclosure has a second main enclosure portion and a second secondary enclosure portion integrated together. The second electronics assembly is housed within the second main enclosure portion. The second fuse box is housed within the second secondary enclosure portion. The second electronics assembly of the second module is electrically connected to the electronics assembly of the first module via the second fuse box of the second module.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
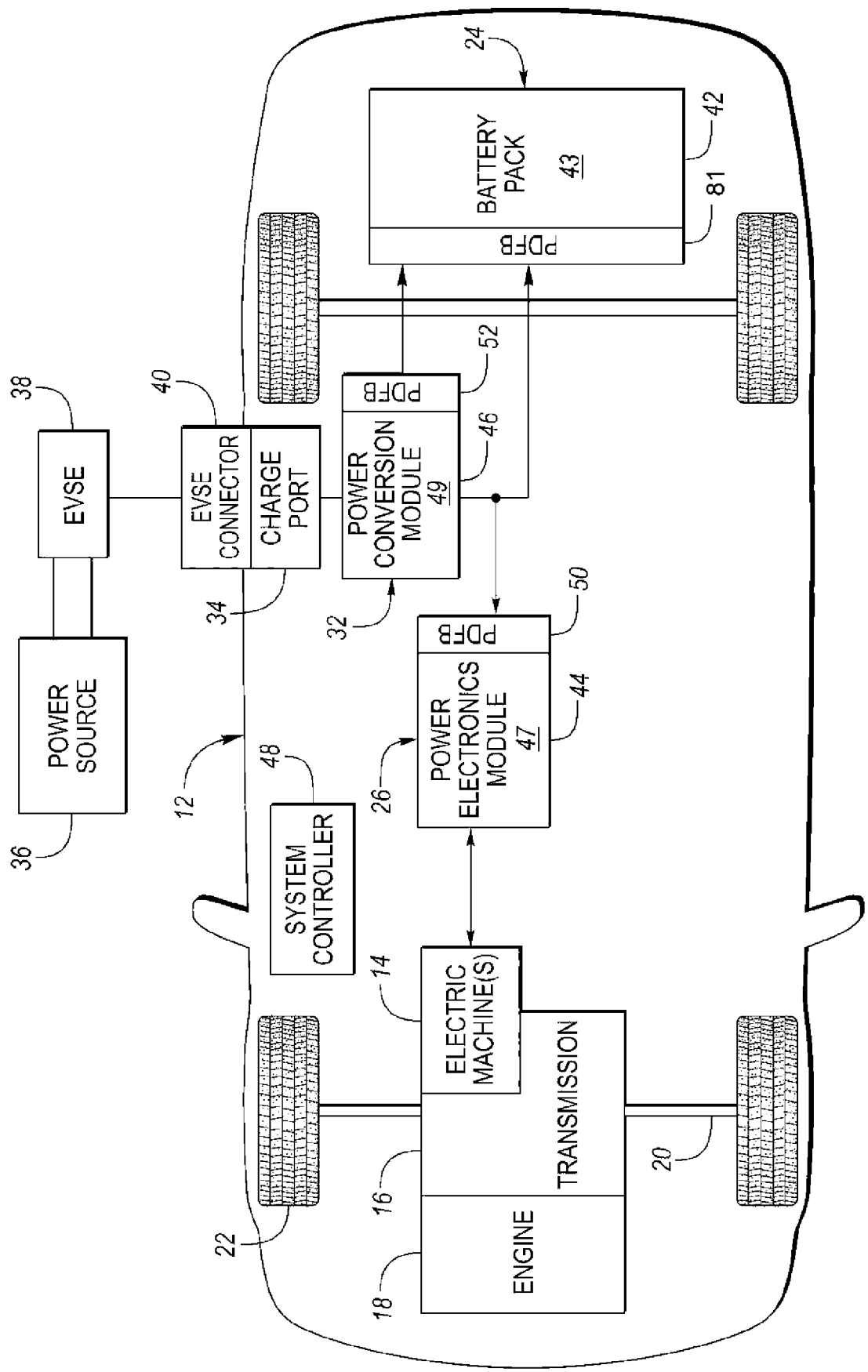
FIG. 1 illustrates a block diagram of an electrified vehicle (EV) in accordance with the present disclosure.

Referring now to FIG. 1, a block diagram of an electrified vehicle (EV) 12 in accordance with the present disclosure is shown. EV 12 includes a traction powertrain having one or more traction motors ("electric machine(s)") 14, a traction battery ("battery pack") 24, and a power electronics module 26 (e.g., an inverter). In this example, EV 12 is a hybrid electric vehicle (HEV). In a HEV configuration, EV 12 further includes an engine 18. In other examples, EV 12 is a battery electric vehicle (BEV). In a BEV configuration, EV 12 does not include engine 18.

Traction motor 14 is part of the traction powertrain of EV 12 for powering movement of the EV (i.e., traction motor 14 is operable to provide propulsion capability to EV 12). In this regard, traction motor 14 is mechanically connected to a transmission 16 of EV 12. Transmission 16 is mechanically connected to a drive shaft 20 that is mechanically connected to wheels 22 of EV 12. Engine 18 is also mechanically connected to transmission 16 to provide propulsion capability to EV 12.

Traction motor 14 can provide propulsion capability to EV 12 while engine 18 is turned on or off. Traction motor 14 is capable of operating as a generator. Traction motor 14 acting as a generator can recover energy that may normally be lost as heat in a friction braking system of EV 12.

Traction battery 24 stores electrical energy that can be used by traction motor 14 for propelling EV 12. Traction battery 24 typically provides a high-voltage (HV) direct current (DC) output. Traction battery 24 is electrically connected to a power electronics module 26. Traction motor 14 is also electrically connected to power electronics module 26. Power electronics module 26, such as an inverter, provides the ability to bi-directionally transfer energy between traction battery 24 and traction motor 14. For example, traction battery 24 may provide a DC voltage while traction motor 14 may require a three-phase alternating current (AC) current to function. Inverter 26 may convert the DC voltage to a three-phase AC current to operate traction motor 14. In a regenerative mode, inverter 26 may convert three-phase AC current from traction motor 14 acting as a generator to DC voltage compatible with traction battery 24.

In this example, EV 12 is a plug-in HEV (PHEV). As such, traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and EV 12. External power source 36 may provide DC or AC electric power to EVSE 38. EVSE 38 may have a charge connector 40 for plugging into a charge port 34 of EV 12.

A power conversion module 32, such as an on-board charger having a DC/DC converter, of EV 12 may condition power supplied from EVSE 38 to provide the proper voltage and current levels to traction battery 24. Power conversion module 32 may interface with EVSE 38 to coordinate the delivery of power to traction battery 24.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating EV 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Traction battery 24, inverter 26, and the DC/DC converter of power conversion module 32 ("DC/DC converter 32") handle high-voltage (HV) electrical power in their operations. For instance, traction battery 24 receives HV electrical power from DC/DC converter 32 for storage therein and the traction battery outputs HV electrical power to inverter 26 for use in propelling EV 12. Inverter 26 converts HV electrical power received from traction battery 24 into the requisite AC electrical power for traction motor 14. DC/DC converter 32 converts electrical power received via external power source 36 into HV electrical power for storage in traction battery 24.

Traction battery 24, inverter 26, and DC/DC converter 32 each include corresponding HV electronics assemblies operable for performing their associated fly electrical power operations. For instance, the HV electronics assembly 43 of traction battery 24 includes interconnected battery cells, a battery controller, etc.; the HV electronics assembly 47 of inverter 26 includes circuitry of transistors, diodes, inductors, etc.; and the HV electronics assembly 49 of DC/DC converter 32 includes circuitry of a DC link capacitor, power switches, and diodes, etc.

Traction battery 24, inverter 26, and DC/DC converter 32 are separate, individual hardware units. In accordance with the present disclosure, each hardware unit may include an enclosure (housing, casting, etc.) having a main enclosure portion with the corresponding HV electronics assembly therein. In this case, for instance, HV electronics assembly 43 of traction battery 24 (i.e., the interconnected battery cells, the battery controller, etc.) is housed within the main enclosure portion of the enclosure of the traction battery. Likewise, HV electronics assembly 47 of inverter 26 (i.e., the circuitry of transistors, diodes, inductors, etc.) is housed within the main enclosure portion of the enclosure of the inverter and HV electronics assembly 49 of DC/DC converter 32 (i.e., the circuitry of a DC link capacitor, power switches, and diodes, etc.) is housed within the main enclosure portion of the enclosure of the DC/DC converter.

As set forth, traction battery 24, inverter 26, and DC/DC converter 32 are high-voltage (HV) modules which may include an enclosure having a main enclosure portion with a corresponding HV electronics assembly therein. For exemplary purposes, each HV module includes an enclosure having a main enclosure portion with a corresponding HV electronics assembly therein. In this regard, as shown in FIG. 1, traction battery 24 includes an enclosure having a main enclosure portion 42 with the traction battery HV electronics assembly 43 therein; inverter 26 includes an enclosure having a main enclosure portion 44 with the inverter HV electronics assembly 47 therein; and DC/DC converter 32 includes an enclosure having a main enclosure portion 46 with the DC/DC converter electronics assembly 49 therein.

The HV electronics assembly of a HV module, such as traction battery 24, inverter 26, and DC/DC converter 32, ordinarily utilizes a power distribution and fuse protection arrangement for the performance of its HV electrical power operations. The power distribution and fuse protection arrangement for the HV electronics assembly of a HV module is ordinarily provided by a junction box that is physically remote from the HV module and connected via wiring or the like to the HV electronics assembly of the HV module.

In accordance with the present disclosure, the enclosure of one or more of the HV modules further includes a secondary enclosure portion with a power distribution fuse box (PDFB) (or "fuse box") arranged therein. As such, the enclosure of a HV module further includes a secondary enclosure portion, the HV module further includes a PDFB, and the PDFB is arranged within the secondary enclosure portion of the enclosure of the HV module. The PDFB of the HV module provides the power distribution and fuse protection arrangement for the HV electronics assembly of the HV module.

Notably, although the PDFB and the HV electronics assembly of the HV module are to be connected for the HV electronics assembly to utilize the power distribution and fuse protection arrangement for the performance of its HV electrical power operations, the PDFB and the HV electronics assembly are otherwise physically isolated and remotely positioned from one another. The PDFB and the HV electronics assembly are physically isolated and remotely positioned from one another as the PDFB is arranged in the secondary enclosure portion of the enclosure of the HV module whereas the HV electronics assembly is arranged in the main enclosure portion of the enclosure of the HV module.

As the PDFB and the HV electronics assembly are in the secondary and main enclosure portions, respectively, an operator can access the PDFB via the secondary enclosure portion without having to access or disturb the HV electronics assembly in the main enclosure portion. As a result, the integrity of the HV electronics assembly will be maintained should an operator access the PDFB such as for repair or updating of the PDFB.

Further, the PDFB is removably insertable into the secondary enclosure portion. As such, an operator can remove the PDFB arranged in the secondary enclosure portion of a HV module and insert a new PDFB in the secondary enclosure portion to replace the removed PDFB. Thus, as the PDFB is physically isolated and remotely positioned from the HV electronics assembly, the PDFB can be replaced without having to replace any of the HV electronics assembly. More generally, the PDFB of a HV module can be replaced without having to replace the entire HV module. In this way, other than the PDFB, the HV module does not have to be replaced or be considered as being potentially problematic.

As set forth, the enclosure of a HV module may further include a secondary enclosure portion in addition to the main enclosure portion. A PDFB may be arranged in the secondary enclosure portion for providing power distribution and fuse protection services to the HV electronics assembly arranged in the main enclosure portion. For exemplary purposes, each HV module includes an enclosure having (i) a main enclosure portion with a corresponding HV electronics assembly therein and (ii) a secondary enclosure portion with a corresponding PDFB therein. In this regard, as shown in FIG. 1, the enclosure of traction battery 24 further includes a secondary enclosure portion 81 with a traction battery PDFB therein; the enclosure of inverter 26 further includes a secondary enclosure portion 50 with the inverter PDFB therein; and the enclosure of DC/DC converter 32 further includes a secondary enclosure portion 52 with the DC/DC converter PDFB therein.

Referring now to FIGS. 2A, 2B, 2C, and 2D, with continual reference to FIG. 1, a HV module in accordance with the present disclosure will be described in greater detail. FIGS. 2A, 2B, 2C, and 2D illustrate conceptual perspective, schematic partial, top cutaway, and slanted cutaway views, respectively, of a HV module in the form of inverter 26.

As shown, inverter 26 has an enclosure including main enclosure portion 44 and secondary enclosure portion 50. The inverter electronics assembly 47 is housed within main enclosure portion 44. A PDFB 60 for providing power distribution and fuse protection services to the inverter electronics assembly 47 is housed within secondary enclosure portion 50.

Main enclosure portion 44 and secondary enclosure portion 50 are integrated with one another in being different portions of the same enclosure. That is, the enclosure is a unitary member having main enclosure portion 44 and secondary enclosure portion 50. In particular, secondary enclosure portion 50 is located outside of the perimeter of main enclosure portion 44 and a side (or wall) 51 of the secondary enclosure portion is integrated with a side (or wall) 45 of the main enclosure portion.

Secondary enclosure portion 50 includes a housing receptacle 62 with a separate removable cover 64. PDFB 60 is arranged within housing receptacle 62. Cover 64 is removed from housing receptacle 62 in order to install PDFB 60 within the housing receptacle. Cover 64 can be subsequently removed from housing receptacle 62 by an operator in order to gain access to PDFB 60 arranged therein.

Housing receptacle 62 is generally entirely enclosed except for the following portions of the housing receptacle. These exposed portions of housing receptacle 62 include a surface of the housing receptacle that is covered by cover 64; one or more ports 68 in the side 51 of secondary enclosure portion 50 integrated with the side 45 of main enclosure portion 44; and one or more connector ports 67 in one or more other sides 53 of the secondary enclosure portion. An external connector 66 is connected to a connector port 67 of secondary enclosure portion 50.

Figure 2A:
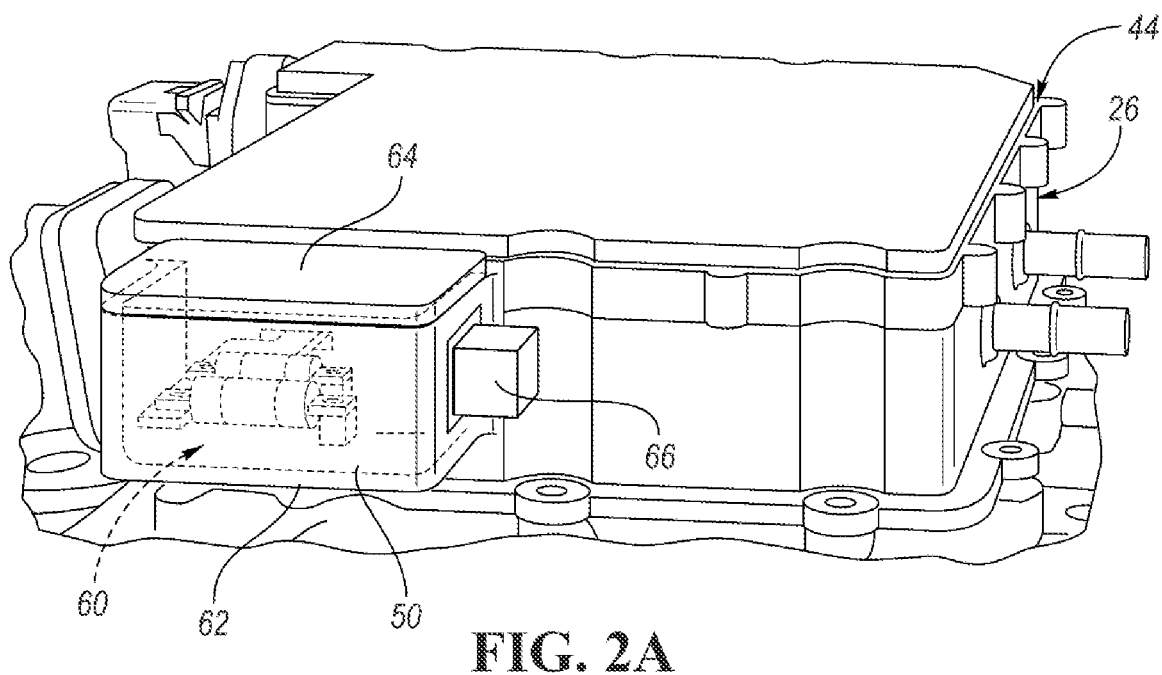
FIG. 2A illustrates a conceptual perspective view of a high-voltage (HV) module of the EV in accordance with the present disclosure, the HV module including an enclosure, a HV electronics assembly for performing HV electrical power operations of the HV module, and a power distribution fuse box (PDFB) for providing power distribution and fuse protection services to the HV electronics assembly, the enclosure having a main enclosure portion with the HV electronics assembly therein and a secondary enclosure portion with the PDFB therein.
Figure 2B:
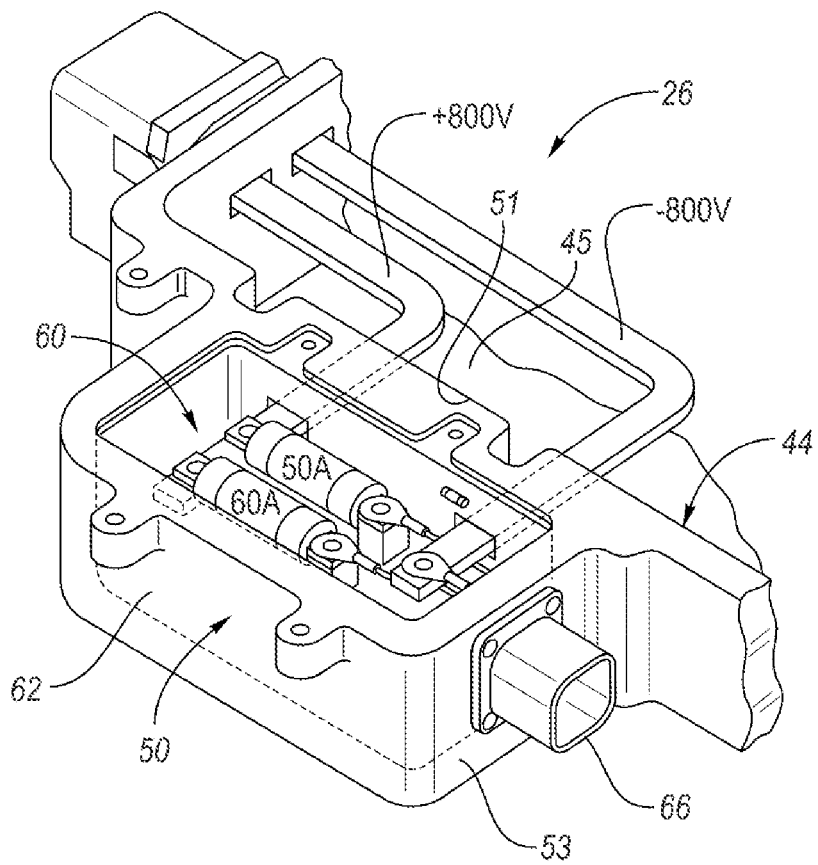
FIG. 2B illustrates a schematic partial view of the HV module, this schematic partial view illustrating a part of the main enclosure portion, the secondary enclosure portion, and the PDFB arranged in the secondary enclosure portion.
Figure 2C:
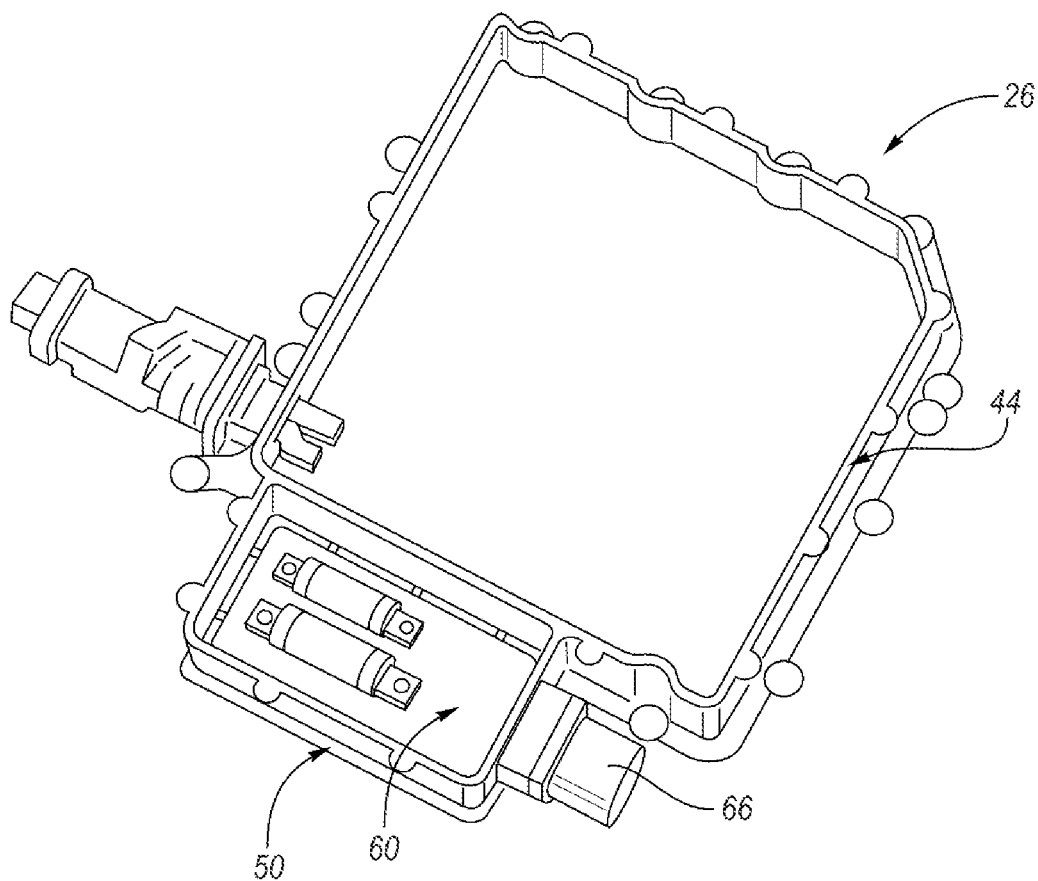
FIG. 2C illustrates a top cutaway view of the HV module, this top cutaway view illustrating the main enclosure portion, the secondary enclosure portion, and the PDFB arranged in the secondary enclosure portion.
Figure 2D:
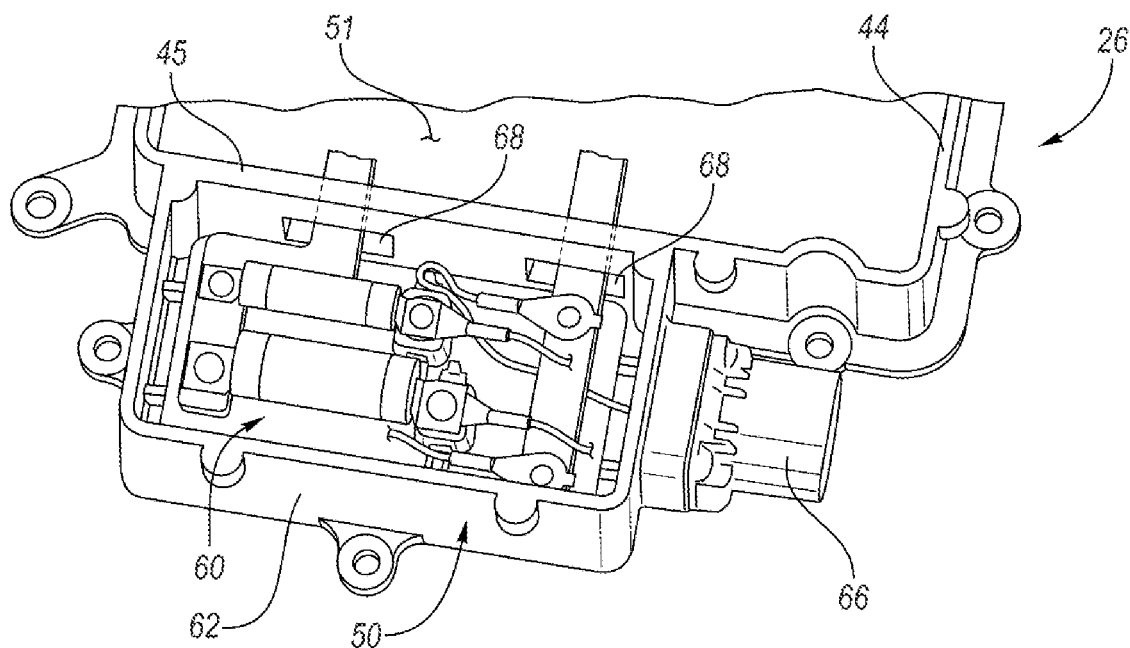
FIG. 2D illustrates a slanted cutaway view of the HV module, this slanted cutaway view illustrating the main enclosure portion, the secondary enclosure portion, and the PDFB arranged in the secondary enclosure portion.
Figure 3A:
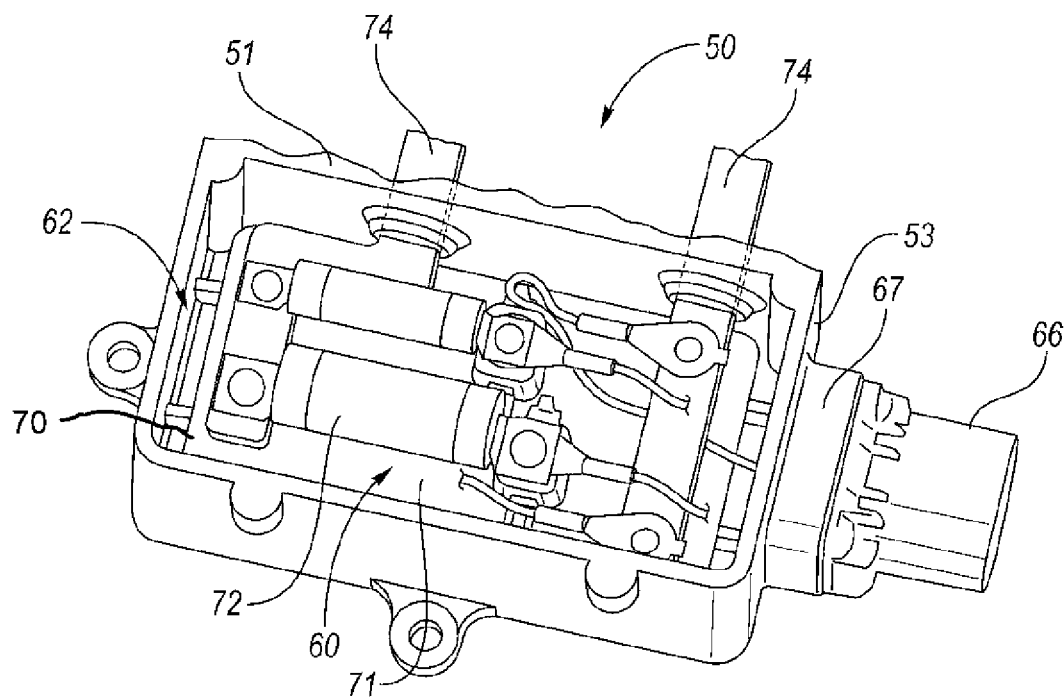
FIG. 3A illustrates a perspective view of the secondary enclosure portion of the enclosure of the HV module and the PDFB arranged therein.
Figure 3B:
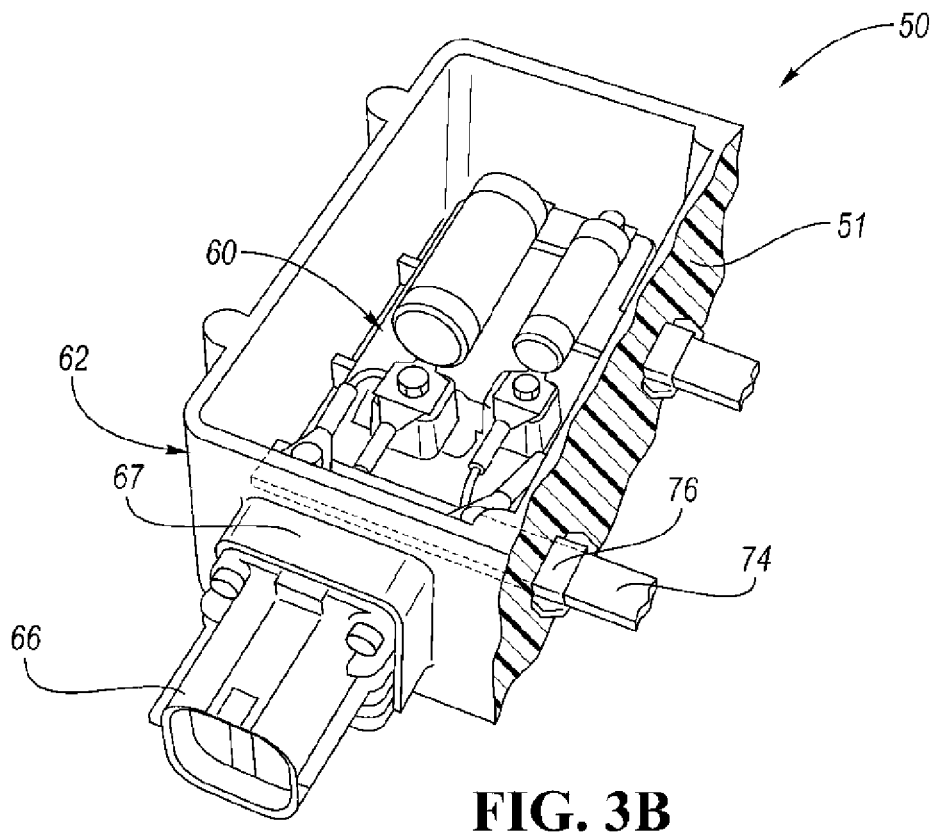
FIG. 3B illustrates another perspective view of the secondary enclosure portion of the enclosure of the HV module and the PDFB arranged therein.

Turning now to FIGS. 3A and 3B, with continual reference to FIGS. 2A, 2B, 2C, and 2D, inverter 26 in accordance with the present disclosure will be described in greater detail. FIGS. 3A and 3B illustrate respective perspective views of secondary enclosure portion 50 and PDFB 60 arranged therein.

PDFB 60 includes a fuse/busbar cartridge (or "fuse cartridge" or "cartridge") 70. Cartridge 70 includes an insulative substrate 71 that provides a mounting surface for receiving fuses 72, busbars 74, and other electrical components of PDFB 60 thereon. In this example, PDFB 60 includes two fuses 72 and a pair of busbars 74 arranged on cartridge 70. Fuses 72 are removably position-able on preassigned portions of cartridge 70. The pair of busbars 74 are for providing positive and negative (e.g., ground) electrical connections to the inverter electronics assembly 47 (or, as indicated in FIG. 2B, to the traction battery electronics assembly 43 via the inverter electronics assembly 47).

As such, when installed, a relatively small portion of busbars 74 respectively extend through ports 68 on side 51 of secondary enclosure portion 50. Ports 68 provide access for busbars 74 to contact corresponding busbars of the inverter electronics assembly 47 for the busbars to make the above-noted electrical connections. Grommets 76 seal ports 68 with busbars 74 extending therethrough. As such, as ports 68 are the only areas of main enclosure portion 44 exposed to secondary enclosure portion 50 and as such ports are sealed and as the main enclosure portion is otherwise fully enclosed, the inverter electronics assembly 47 is sealed off from the external environment including being sealed off from PDFB 60.

One end of one of the busbars 74 (e.g., the positive busbar) is mounted to cartridge 70 for this end to connect with one end of fuses 72 (e.g., the positive fuse end). The other end of the other one of the busbars (e.g., the negative or ground busbar) is mounted to cartridge 70 for this end to complete circuits in which fuses 72 are employed. In this regard, the other end of fuses 72 (e.g., the negative or ground fuse end) are connected to respective wiring leading to connector 66 and the other end of the other one of the busbars is connected to respective wiring leading from the connector. For example, connector 66 is a four-way connector in which a first fuse 72 is part of a first circuit having a first positive wiring and a second negative wiring and in which a second fuse 72 is part of a second circuit having a third positive wiring and a fourth negative wiring.

PDFB 60 is removably insertable into secondary enclosure portion 50 in that the PDFB can be dismantled for removal by an operator. Typically, a component of PDFB 60 such as a fuse 72 may need replacement and such fuse can be easily removed by the operator. That is, should a problem with PDFB 60 arise (for instance, a problem with a fuse 72), an operator can gain easy access to the PDFB without having to access or disturb the inverter electronics assembly 47. As a result, inverter electronics assembly 47 is left intact when PDFB 60 is accessed and/or a fuse 72 thereof is replaced.

As indicated, FIGS. 2A, 2B, 2C, 2D, 3A, and 3B pertain to a HV module in the form of inverter 26. The description thereof pertains to other HV modules such as in the form of traction battery 24 and DC/DC converter 32.

As described, the present disclosure provides an embedded, modular HV PDFB design that is integrated into any HV module housing/enclosure/casting (e.g., HV battery, inverter inverter system controller (ISC)), DC/DC converter, etc.) and is from the electronics of the HV module. The PDFB uses a reusable fuse/busbar cartridge which attaches externally and connects directly to the electronics of the HV module via busbars (and/or electric distribution system (EDS) cables) thereby reducing wire lengths, connectors, brackets, and weight while improving serviceability and manufacturing. The PDFB design also reduces HV module complexity and offers interchangeable fuse configurations for upgradability and reusability on different types of electrified vehicles. The PDFB design eliminates dedicated HV junction boxes and offers a unique isolated fusing serviceability to limiting access for the fuses for the HV module only without disturbing the electronics of the HV module.

The PDFB design can be designed to be locally embedded to any front or rear I-IV module connecting many different electrified vehicle options like ePTO (electric power take-off), OBC (on-board charging), ISC (inverter system control), PTC (positive temperature coefficient) heater, and others thereby minimizing wire lengths and manufacturing assembly. Overall, the PDFB design enables localized power distribution and fusing with enhanced overall electromagnetic compatibility.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:
1. A high-voltage module comprising:
an enclosure including a main enclosure portion and a secondary enclosure portion integrated together, the main enclosure portion and the secondary enclosure portion having a common wall in being integrated together, the common wall including a first port and a second port; and
a fuse box housed within the secondary enclosure portion for providing a power distribution and fuse protection arrangement to an electronics assembly housed within the main enclosure portion, the fuse box including a cartridge having at least one fuse, a first busbar, a second busbar, and an insulative substrate, each fuse being positioned on the insulative substrate, the first and second busbars being mounted on the insulative substrate, a first end of each fuse being mounted to the first busbar, and the first and second busbars respectively extending through the first and second ports of the common wall to respectively connect with first and second busbars of the electronics assembly to make an electrical connection between the fuse box and the electronics assembly;
another wall of the secondary enclosure portion includes a connector port for receiving a connector for establishing an electrical connection via the fuse box between the electronics assembly and an external device; and
a second end of each fuse is connected to respective wiring leading to the connector, and the second busbar is connected to wiring leading from the connector.
2. The high-voltage module of claim 1 wherein:
the secondary enclosure portion is external to a perimeter of the main enclosure portion.
3. The high-voltage module of claim 1 wherein:
the fuse box is accessible without having to access either the main enclosure portion or the electronics assembly housed within the main enclosure portion.
4. The high-voltage module of claim 1 wherein:
the at least one fuse is replaceable without having to access the main enclosure portion or the electronics assembly housed within the main enclosure portion.
5. The high-voltage module of claim 1 wherein:
the secondary enclosure portion forms a housing receptacle for housing the fuse box and includes a separate removable cover that covers the housing receptacle.
6. The high-voltage module of claim 5 wherein:
the housing receptacle of the secondary enclosure portion is sealed off from the main enclosure portion.
7. The high-voltage module of claim 1 wherein:
the high-voltage module is a traction inverter for an electrified vehicle.
8. A high-voltage module for an electrified vehicle, comprising:
an enclosure including a main enclosure portion and a secondary enclosure portion integrated together, the main enclosure portion and the secondary enclosure portion having a common wall in being integrated together, the common wall including a first port and a second port;

an electronics assembly for performing electrical power operations involving propulsion of the electrified vehicle, the electronics assembly being housed within the main enclosure portion; and a fuse box for providing a power distribution and fuse protection arrangement to the electronics assembly, the fuse box being housed within the secondary enclosure portion, the fuse box including a cartridge having at least one fuse, a first busbar, a second busbar, and an insulative substrate, each fuse being positioned on the insulative substrate, the first and second busbars being mounted on the insulative substrate, a first end of each fuse being mounted to the first busbar, and the first and second busbars respectively extending through the first and second ports of the common wall to respectively connect with first and second busbars of the electronics assembly to make an electrical connection between the fuse box and the electronics assembly;

another wall of the secondary enclosure portion includes a connector port for receiving a connector for establishing an electrical connection via the fuse box between the electronics assembly and an external device; and a second end of each fuse is connected to respective wiring leading to the connector, and the second busbar is connected to wiring leading from the connector.

9. An electrified vehicle comprising:

a traction powertrain having a first module, wherein the first module is a traction battery, an inverter, or a DC/DC converter; and wherein the first module includes an enclosure having a main enclosure portion and a secondary enclosure portion integrated together, the main enclosure portion and the secondary enclosure portion having a common wall in being integrated together, the common wall including a first port and a second port, the first module further including an electronics assembly for performing electrical power operations involving propulsion of the electrified vehicle, the electronics assembly being housed within the main enclosure portion, and the first module further including a fuse box for providing a power distribution and fuse protection arrangement to the electronics assembly, the fuse box being housed within the secondary enclosure portion, the fuse box including a cartridge having at least one fuse, a first busbar, a second busbar, and an insulative substrate, each fuse being positioned on the insulative substrate, the first and second busbars being mounted on the insulative substrate, a first end of each fuse being mounted to the first busbar, and the first and second busbars respectively extending through the first and second ports of the common wall to respectively connect with first and second busbars of the electronics assembly to make an electrical connection between the fuse box and the electronics assembly;

another wall of the secondary enclosure portion includes a connector port for receiving a connector for establishing an electrical connection via the fuse box between the electronics assembly and an external device; and a second end of each fuse is connected to respective wiring leading to the connector, and the second busbar is connected to wiring leading from the connector.

10. The electrified vehicle of claim 9 wherein:

the traction powertrain further includes a second module of a different type than the first module; and wherein the electronics assembly of the first module is electrically connected to the second module via the fuse box of the first module.

11. The electrified vehicle of claim 10 wherein:

the second module includes a second enclosure having a second main enclosure portion and a second secondary enclosure portion integrated together, a second electronics assembly for performing electrical power operations and being housed within the second main enclosure portion, and a second fuse box for providing a power distribution and fuse protection arrangement to the second electronics assembly and being housed within the second secondary enclosure portion; and wherein the second electronics assembly of the second module is electrically connected to the electronics assembly of the first module via the second fuse box of the second module.

12. The electrified vehicle of claim 10 wherein:

the first module is the traction battery, and the second module is the inverter.

13. The electrified vehicle of claim 10 wherein:

the first module is the traction battery, and the second module is the DC/DC converter.

14. The electrified vehicle of claim 9 wherein:

the fuse box is accessible without having to access either the main enclosure portion or the electronics assembly housed within the main enclosure portion.

15. The electrified vehicle of claim 9 wherein:

the secondary enclosure portion forms a housing receptacle for housing the fuse box and includes a separate removable cover that covers the housing receptacle.

* * * * *